United States Patent [19]

Schwartz et al.

[11] 3,870,411

[45] Mar. 11, 1975

[54] COLLAPSIBLE SLIDE PROJECTION THEATRE

[75] Inventors: Robert C. Schwartz, Woodmere, N.Y.; Frederick Burke, Riverside, Conn.

[73] Assignee: Motiva, Ltd., New York, N.Y.

[22] Filed: Feb. 26, 1973

[21] Appl. No.: 335,643

[52] U.S. Cl. ............... 353/73, 352/104, 353/78, 353/119
[51] Int. Cl. ............... G03b 21/28, G03b 21/30
[58] Field of Search .......... 353/73, 78, 119, 72, 74, 353/77; 352/104

[56] References Cited
UNITED STATES PATENTS

| | | | |
|---|---|---|---|
| 2,762,256 | 9/1956 | Gottschalk | 353/78 |
| 3,560,088 | 2/1971 | Schwartz | 353/78 |
| 3,715,155 | 2/1973 | Grupp | 353/78 |
| 3,746,437 | 7/1973 | Pammer | 352/104 |
| 3,779,634 | 12/1973 | Kirchgessner | 353/78 |

FOREIGN PATENTS OR APPLICATIONS

| | | | |
|---|---|---|---|
| 1,517,793 | 1/1969 | France | 353/78 |

Primary Examiner—Richard E. Aegerter
Assistant Examiner—Steven L. Stephan

[57] ABSTRACT

A highly-compact, collapsible rear-screen theatre of attaché-case size for a slide projector having a box-like housing on whose front wall is mounted a projection lens at a position adjacent one side of the housing. The theatre includes an open-top casing for accommodating the slide projector and a minor reflector which receives an image from the lens and directs it laterally onto an intermediate reflector that directs the image upwardly toward a major reflector pivotally mounted at one end of the casing. The major reflector is shiftable from a collapsed position overlying the top of the casing to an operative, inclined position in which the received image is directed toward the rear of the translucent screen pivotally mounted at the other end of the casing. The screen is shiftable from a collapsed position overlying the top of the casing to an operative, erect position for presentation of the image to a viewer. A cover is provided which, in its collapsed state, overlies both the collapsed screen and the collapsed major reflector and encloses the casing. The cover is mechanically linked to the screen and to the reflector such that when the cover is elevated, it acts to raise both the screen and the major reflector to their operative positions, the cover then extending between the upper edges of the screen and the major reflector.

6 Claims, 8 Drawing Figures

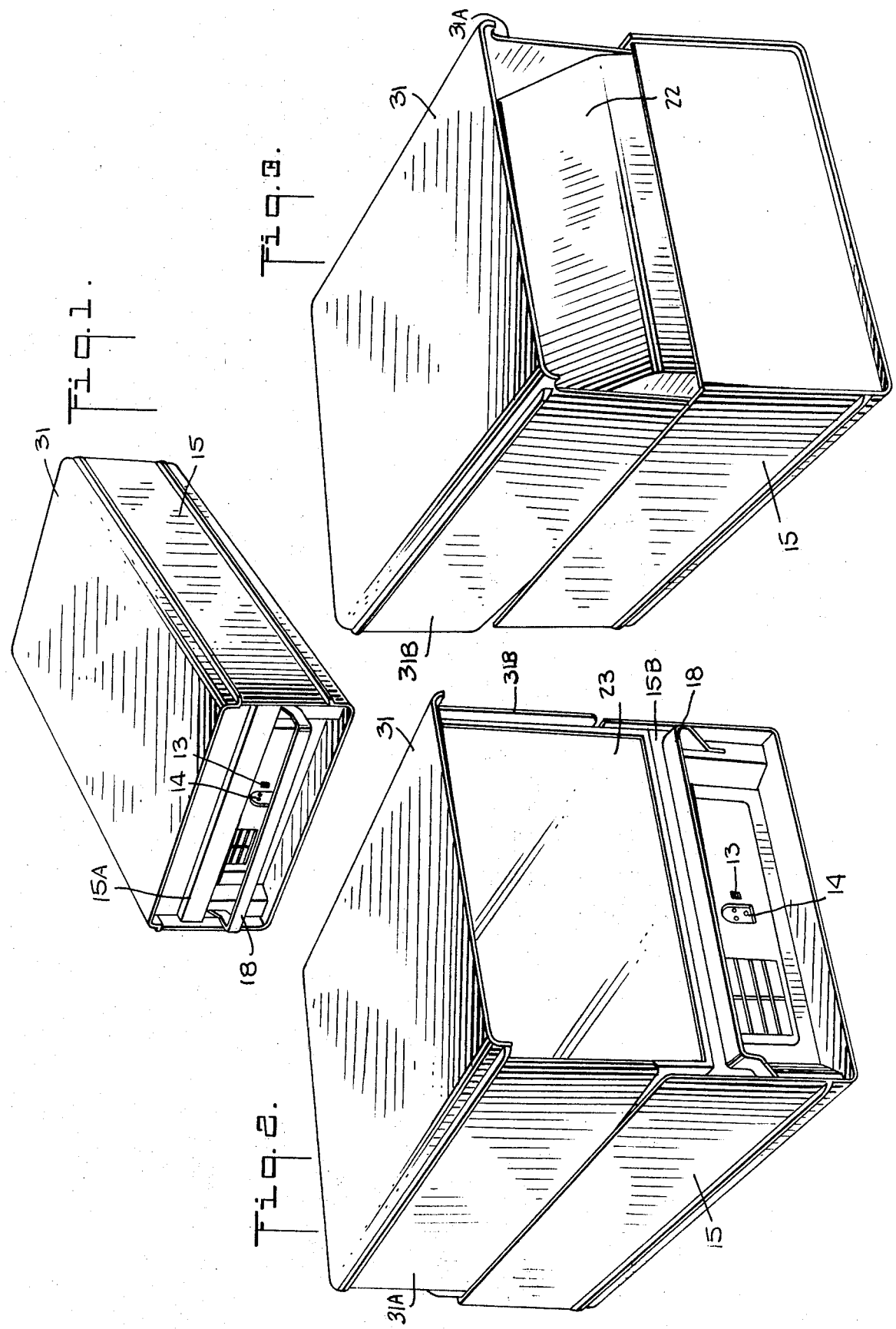

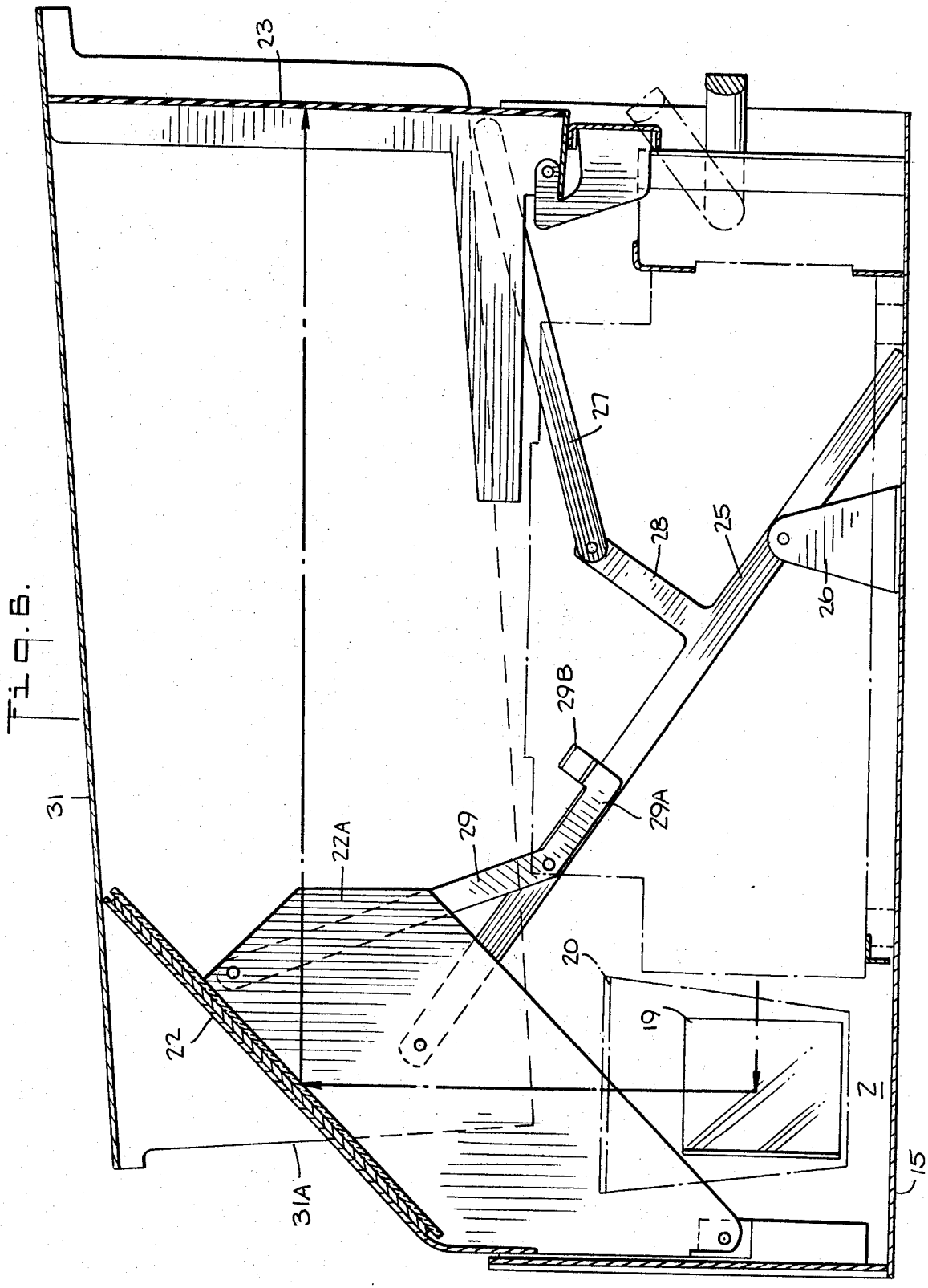

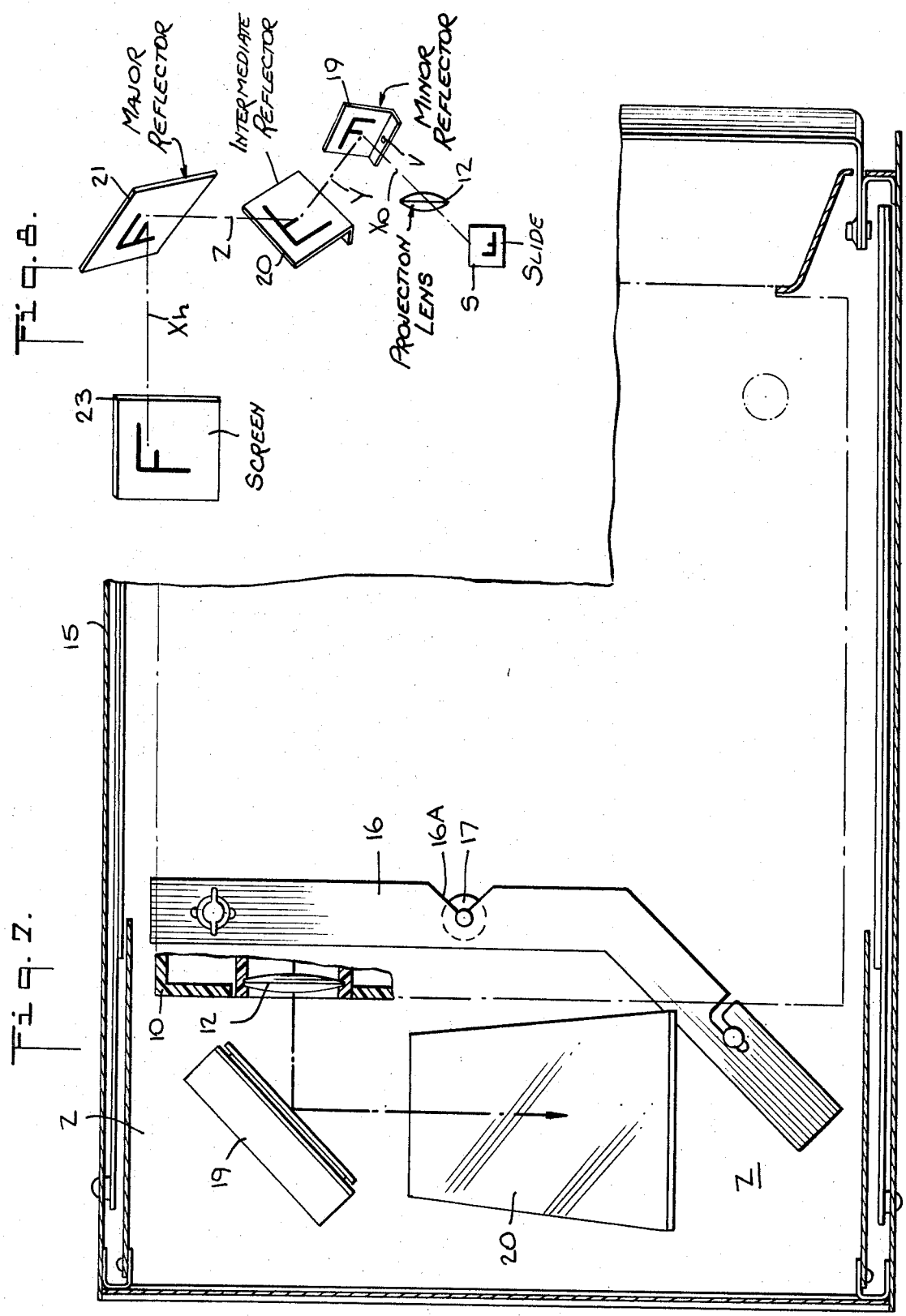

COLLAPSIBLE SLIDE PROJECTION THEATRE

BACKGROUND OF INVENTION

This invention relates generally to rear-screen projection systems for film slides, and more particularly to a highly-compact, self-contained viewer wherein a standard slide projector is contained within a collapsible theatre which, when erected, is adapted to project film images onto the rear of a viewing screen and when collapsed, may be carried in the manner of an attaché case.

In order to present film slides in a continuous sequence, existing slide projectors make use of slide trays in combination with an indexing mechanism adapted to transfer the slides successively into an optical path for projection. For example, in slide projectors manufactured and sold by the Eastman Kodak Company under the trademarks "Carousel" and "Ektagraphic," the slide tray is in the form of a turntable which is indexed to successively project slides withdrawn from the circular array of slides in the tray.

In a conventional projection arrangement, the picture is cast onto the front of a screen which is set up in a room at a suitable distance from the projector. This arrangement is generally acceptable in the home, where the room may be darkened and where a screen may be conveniently placed. However, the screen appearance of an illuminated visual image is determined to a great extent by contrast with its background. In conventional front-screen projection, the screen brightness is directly affected by ambient lighting conditions, and in a brightly lit room it is virtually impossible to see the image when using front-screen projection.

There are many situations in which front-screen projection has distinct drawbacks. Thus, at trade shows and conventions as well as in showrooms, slide projectors are often used to present relevant promotional material. When an exhibitor has an assigned booth in a convention hall, he may find it difficult to set up a front-view screen within the limited confines of his assigned space so that it can be readily viewed by visitors. Moreover, the bright lighting in a typical hall or show room militates against an effective front-screen presentation. This same problem arises in other situations calling for audio-visual communication, as in museums, department stores and shopping centers, where the environmental illumination is ordinarily bright and space is limited.

In modern sales promotional techniques, it is now common practice for sales personnel to make presentations by means of slide projectors. It is not feasible or desirable, in most instances, to set up a front view screen. The need exists, therefore, for a compact slide projection theatre capable of being quickly installed and adapted to present bright and clear images.

In the prior Schwartz Pat. No. 3,560,088, there is disclosed a collapsible rear-screen projection theatre for successively presenting the images of slides contained in a standard slide projector. The slide image from the projector is directed onto an inclined first mirror secured to the front wall of the theatre case. Mounted above an opening in the top of the case is a foldable screen assembly having an inclined second mirror, such that when the assembly is erected, the slide image is reflected by the first mirror upwardly through the opening in the case, onto the second mirror which, in turn, directs the image onto the rear of a translucent screen. When the assembly is collapsed, the screen lies on top of the case.

A collapsible rear view projection theatre of the type disclosed in the Schwartz patent is not sufficiently compact nor adequately protected for practical use in many commonplace situations.

Travel by sales personnel is largely by commercial plane, where passengers are not permitted to carry baggage to their seats unless the baggage can be stowed in the small storage space below the seat. Acceptable for this purpose is the so-called attaché case which is shallow and of rectangular shape. But a collapsible theatre of the type disclosed in the Schwartz patent cannot be carried on board a plane even though it has a handle; first, because it is oversized, and second, because the exposed screen is unprotected and easily damaged.

The reason why the case of the patented Schwartz type of collapsible slide projection theatre is oversize lies in the nature of the arrangement which dictates that the case be substantially larger than the housing of the slide projector. A standard projector has a box-like housing above which is mounted a circular slide tray which revolves on a center post on top of the housing. The images are projected from a lens mounted on the front wall of the housing at a position adjacent to one side thereof. In order to provide an adequate projection distance between the lens and the screen, a relatively large vacant space is provided between the lens and the first mirror lying against the front wall of the case, and in order to center the lens with respect to this mirror, the projector housing must be positioned off-center within the case, creating another vacant space therein. Thus the length and width of the case is considerably greater than the length and width of the projector housing.

SUMMARY OF INVENTION

Accordingly, it is the main object of this invention to provide a self-contained, rear-screen theatre which incorporates a standard slide projector and is capable of producing images having a high degree of visibility even in brightly lit rooms.

A significant advantage of the invention is that in rear-screen projection, the image is focused on the sensitive rear surface of a dark translucent screen, thereby enhancing the contrast between the picture and the screen background.

Also an object of the invention is to provide a self-contained theatre of the above-type which is small, lightweight and portable, and which may be conveniently carried and quickly erected. A theatre in accordance with the invention is usable in showrooms, in convention booths and in all other situations where front-screen projection is precluded or is disadvantageous.

A salient feature of the invention is that the theatre casing has dimensions which are not much larger than those of the box-like housing of the slide projector contained therein, so that the overall-dimensions of the theatre in the collapsed state approximates that of an attaché case. It becomes feasible, therefore, for sales and other personnel to carry the theatre in its collapsed state, aboard a plane, to be stowed in the small space underneath the passenger seat. Another advantage of the present invention is that all components of the collapsed theatre, including the screen, are fully enclosed within the casing and are protected thereby.

Yet another object of the invention is to provide a theatre of the above-type which is sealed against ambient light to produce clear, bright, screen images of good quality.

Briefly stated, these objects are attained in a collapsible rear-screen projection theatre for successively presenting the images of slides contained in a standard slide projector having a box-like housing, above which is mounted a circular slide tray, the slide images being projected by a lens mounted on the front wall of the housing adjacent one side thereof.

The theatre includes an open-top casing for accommodating the slide projector as well as a mirror reflector which directs the image received from the lens laterally onto an intermediate reflector that directs the image upwardly toward a major reflector pivotally mounted at one end of the casing. The major reflector is shiftable from a collapsed position in which it overlies the top of the casing, to an operative, inclined position in which the image received thereby is directed toward the rear of a screen pivotally mounted at the other end of the casing. The screen is shiftable from a collapsed position overlying the top of the casing to an operative erect position for presentation of the image to a viewer.

A cover is provided which, in the collapsed state, overlies the collapsed screen and the collapsed major reflector and encloses the casing. The cover is operatively linked to the screen and to the major reflector such that when the cover is elevated above the casing it acts to raise the screen and the major reflector to their operative positions, the cover then extending between the upper edges of the screen and the major reflector. The cover is provided with side curtain walls that shield the interior of the casing from ambient light.

OUTLINE OF DRAWINGS

For a better understanding of the invention, as well as other objects and further features thereof, reference is made to the following detailed description to be read in conjunction with the accompanying drawings, wherein:

FIG. 1 is a perspective view of a collapsible slide projector theatre in accordance with the invention, the theatre being shown in its collapsed state in which it may be carried in the fashion of an attache case;

FIG. 2 shows the same theatre in its operative state, as seen looking toward the screen;

FIG. 3 shows the same theatre in its operative state, as viewed from the rear;

FIG. 6 is a longitudinal section of the theatre in its operative state;

FIG. 7 is a plan view of the theatre and casing;

FIG. 8 is a schematic diagram illustrating the optical path of the image from the projector lens to the rear of the viewing screen.

DESCRIPTION OF INVENTION

Since the collapsible, rear screen theatre in accordance with the invention is designed to incorporate a standard slide projector, such as the Kodak Ektographic type, it is best to first consider the physical form of such a projector and some of its operating elements.

Figure 4:
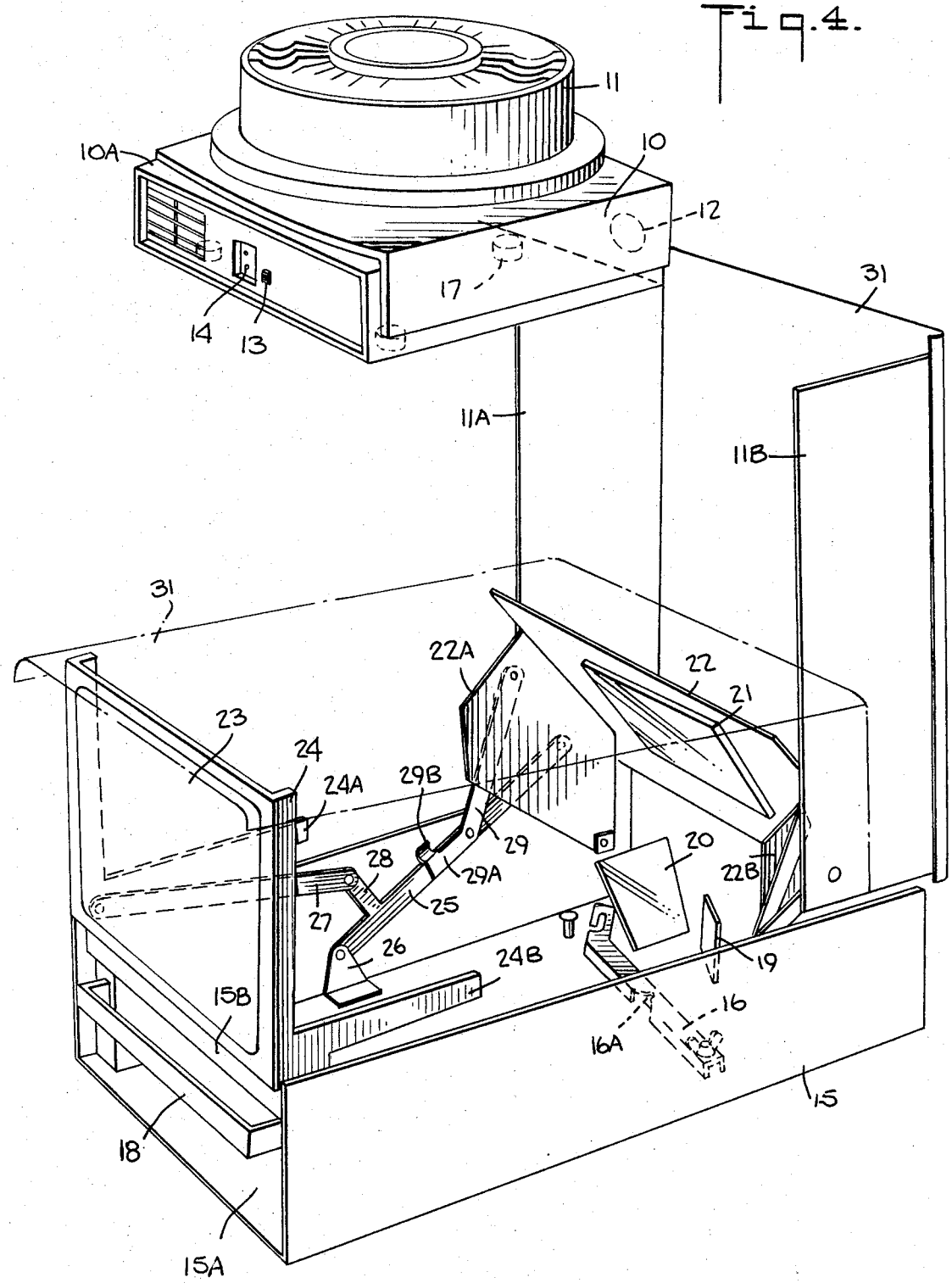
FIG. 4 is a perspective view of the theatre in its operative state, the case cover being swung upwardly to permit removal of the slide projector from the casing.

As shown in FIG. 4, the standard slide projector includes a box-like housing 10, above which is mounted a circular, multi-chamber slide tray 11, rotatable about a center post. The projector includes a lens 12 serving to project the images of slides introduced into a gate as the tray is indexed.

It is important to note that lens 12, mounted on the front wall of the housing 10, is not centered thereon but is positioned adjacent one side wall of the housing. The reason for this arrangement is that since the tray turns about a vertical center on the housing, the slides all lie within an annular zone concentric with this center and drop into a gate adjacent this side wall of the housing. Hence the lens too must be adjacent this side wall to bring it into optical alignment with the operative slide.

The rear wall of the projector housing is a central panel containing a power switch 13 and a control receptacle 14 to receive a plug from which extends a cable running to a control box operated by the user. Thus, when the projection theatre is set up, the cable is extended therefrom so that the user may control the slide presentation in the usual manner.

The slide projector is seated within an open-top casing 15 of rectangular form whose dimensions, though not much greater than that of the projector, are nevertheless sufficient to enclose all of the components of the system, including the viewing screen, to provide a highly compact and portable assembly. To anchor the projector within casing 15 and yet afford access to the control panel, the rear of casing 15 is provided with an open window 15-A across the top of which is a cross bar 15-B that fits neatly over the rear ledge 10-A of the projector housing, as shown in FIGS. 1 and 2.

The projector is held in place by means of a locking piece 16, one end of which is hinged to the base of casing 15. The piece has a notch 16-A therein adapted to engage a peg 17 projecting below the base of housing 10. Casing 15 is provided with a pivoted carrying handle 18 which may be extended outwardly when in use or folded to one side to afford access to the control panel of the projector. In practice, the collapsed theatre may be fitted within a leather or plastic outer case to assume the appearance of a conventional attaché case.

As best seen in FIGS. 6 and 7, the width of casing 15 is about the same as that of the projector housing, whereas the length of the casing is somewhat longer than that of the housing to provide a narrow zone Z in advance of the front wall of the housing on which the projection lens is mounted. The height of the casing is about the same as the height of the projector.

Disposed within Zone Z is a minor reflector 19 mounted on the base of the casing and so oriented with respect to projection lens 12 as to receive the projected image and to direct it laterally toward an intermediate reflector 20 also mounted on the base of the casing. Intermediate reflector 20 is so oriented as to divert the received image upwardly toward a major reflector 21 mounted on an inclined panel 22 hinged to the casing. Major reflector 21 is angled to direct the image down the length of the casing onto the rear of a screen 23 held within a frame 24 hinged to the other end of the casing.

Screen 23, which is rectangular, is preferably constituted by a sheet of fairly dark translucent material acting to enhance the contrast between the illuminated image presented thereon and the screen background. In practice, the screen may be of the high-gain type known commercially as a "Polacoat Lenscreen" whose front surface includes a special non-glare coating to diffuse harsh reflections.

Referring now to FIG. 8, there is shown the folded optical path extending between lens 12 on the front of the projector housing and the viewing screen 23 at the other end of the casing. For simplicity, the image on a slide S being projected is shown as a capital letter F which in its normal or erect state, has a horizontal top bar at the "up" position and a vertical side bar at the left. In order that the image of this letter appears properly on screen 23, the slide is placed in the projector so that the top bar is at the left and the side bar is at the "down" position.

Letter F is projected onto minor reflector 19 through lens 12 along the optical axis $X_o$ and because of the left-to-right and up-and-down reversal effected by the lens, letter F appears on minor reflector with its side bar up and its top bar to the right. Minor reflector 19 directs this image laterally along axis Y onto intermediate reflector 20 where the image now appears with its top bar to the left and its side bar up. Intermediate reflector 20 directs the image upwardly onto the major reflector 21 along the vertical axis Z, the letter appearing on the major reflector with its top bar up and its side bar to the left, which is the normal or erect state.

From the major reflector, the image is directed onto the rear of screen 23 along the horizontal axis $X_h$ whereby it is seen in its normal state when viewed from the front of the screen.

We shall now consider the manner in which cover 31 is mechanically interlinked both with major reflector 21 and screen 23 so that when the cover is manually lifted above casing 15, the reflector and screen are then automatically raised to their operative positions, and when the cover is lowered, the reflector and screen are both folded down to overlie the top of the casing, the cover then enclosing the casing. Cover 31 is provided on both sides with rectangular curtain walls 31-A and 31-B serving as shades to prevent ambient light from entering the casing when the cover is raised.

The linkage mechanism has duplicate sections and is arranged on either side of the projector housing in the casing. We shall, therefore, consider only one section of the linkage which includes a lever arm 25. As best seen in FIG. 4, arm 25 has one end pivotally connected to side wall 31-A of cover 31 at a point adjacent its lower edge. Lever arm 25 is pivotally connected at a point adjacent its other end to a fulcrum 26 secured to the base of the casing, so that the arm is swingable with respect to the fulcrum. Thus, when the cover is lifted, the lever arm is tilted upwardly, and when the cover is in place over the casing, the lever arm assumes a horizontal position.

Frame 24, which holds the screen, is operatively coupled to lever arm 25 by a link piece 27, one end of which is pivotally connected to a stub 28 extending upwardly from arm 25, the other end being pivotally connected to the frame. Frame 24 is provided with a pair of legs 24-A and 24-B which extend therefrom to block entry of ambient light.

Thus, when cover 31 is lifted and lever arm 25 is caused to tilt upwardly, this action serves to swing frame 24 to its erect, operative position, as shown in FIG. 4. But when cover 31 is lowered, frame 24 is then folded down over the top of the casing to assume its collapsed position, as shown in FIG. 5.

Inclined panel 22, which supports major reflector 21, is provided with side shields 22-A and 22-B. As shown in FIG. 4, shield 22-A is coupled by a link piece 29 to lever arm 25 such that when the arm is tilted upwardly, the major reflector is then raised to its operative position. This position is maintained by means of a latching extension 29-A or link piece 29 provided with a resilient tab 29-B that engages the upper edge of lever arm 25 to prevent movement of this arm. However, by pressing tab 29-B to disengage it from the lever arm, the arm may then be moved to collapse the screen and major reflector. Thus when cover 31 is fully lifted to swing both the screen and the major reflector to their operative positions, the linkage mechanism is latched to maintain those elements in place.

Figure 5:
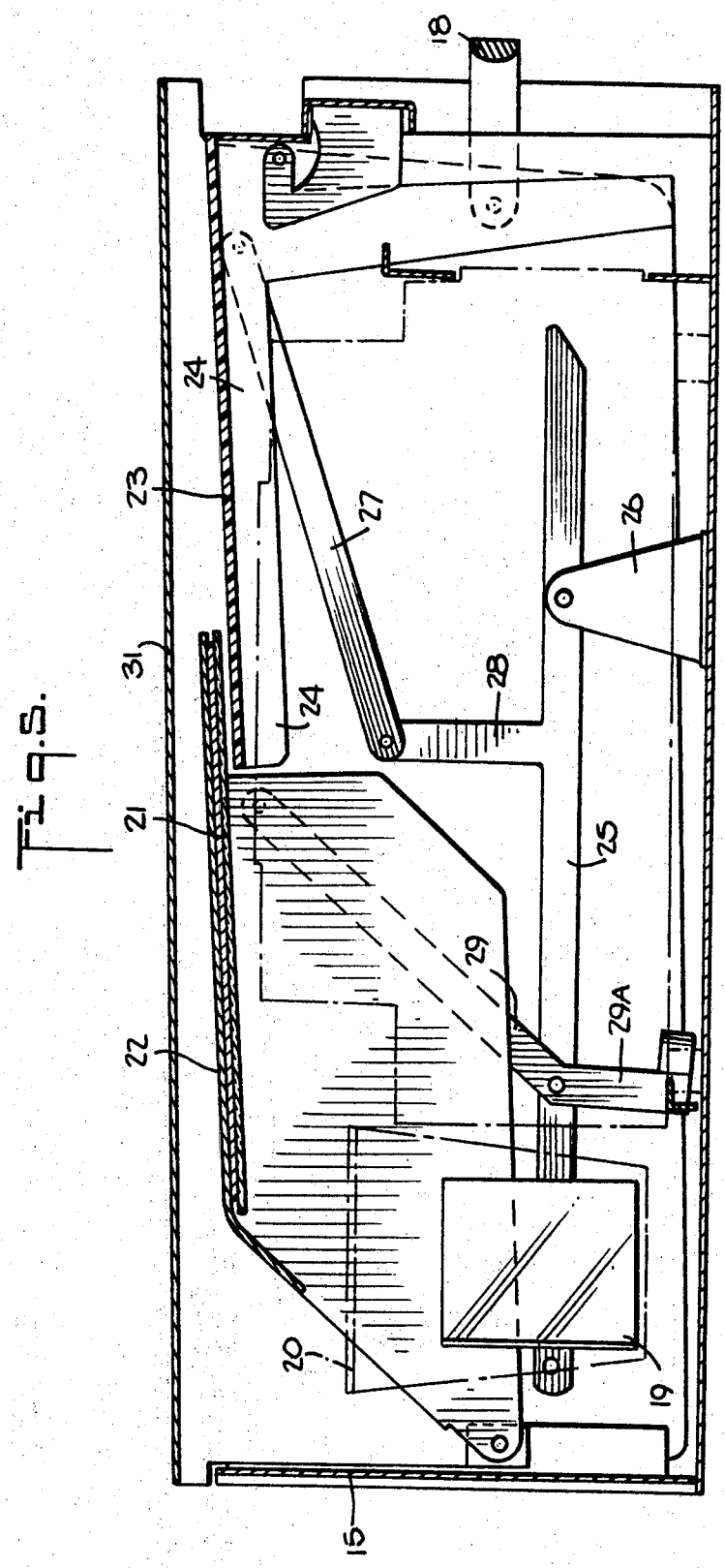
FIG. 5 is a longitudinal section taken through the theatre in its collapsed state.

In the collapsed state, as shown in FIG. 5, screen 23 is folded down over the top of casing 15 as is major reflector 21, and cover 31 then overlies both the collapsed screen and the collapsed major reflector to fully enclose the casing. When, as shown in FIG. 6, cover 31 is lifted, screen 23 is erected and major reflector 21 is raised, the cover 31 then extending between the upper edges of these elements. Since the raised cover is pivotally connected to the linkage mechanism, it may be swung upwardly to an open position, as shown in FIG. 4, to provide access to the casing so that slide trays may be removed and replaced on the projector.

In swinging the cover to an open position, one does not alter the existing optical relationship between the projector and the reflectors associated therewith. But it does provide access to the projector and the reflectors so that one may adjust the position of the image on the screen. Minor reflector 19 as shown in FIG. 8, is mounted for rotation about a vertical axis and may be moved from left to right to shift the image up or down. Intermediate reflector 20 is mounted so that its angle relative to the horizontal plane H is adjustable whereby the image may be shifted on the screen to the left or to the right.

While there has been shown and described a preferred embodiment of collapsible slide projector theatre in accordance with the invention, it will be appreciated that many changes and modifications may be made therein without, however, departing from the essential spirit of the invention.

We claim:

1. A compact, collapsible theatre for a standard slide projector having a box-like housing on whose front wall is mounted a projection lens that is disposed adjacent one side of the housing, said theatre comprising:

A. an open top box-like casing for accommodating said projector and having a narrow zone therein at one end of the casing in advance of the front wall of the housing, the optical axis of said projection lens being parallel to the side of the casing which corresponds to said one side of said housing, said casing having a width which is substantially the same as that of said housing and a height substantially the same as that of said housing;

B. a translucent screen hinged to said casing at the other end thereof and shiftable from an operative position in which the screen is erect, to a collapsed position in which the screen is folded over the top of the casing;

C. a reflecting system constituted by a minor reflector disposed in said zone and oriented to receive an image from said lens and to direct it laterally onto an intermediate reflector disposed in said zone and oriented to direct the image upwardly toward a major reflector, said major reflector being hinged to said casing at said one end thereof and being shiftable from an operative position in which it is oriented to direct the image received from the intermediate reflector onto the rear of said erect screen along an optical path parallel to the optical axis of said projection lens, to a collapsed position in which it is folded over the top of the casing; and D. a cover for said casing, said cover being operatively linked both to said screen and said major reflector whereby when said cover is lifted it causes both said screen and said major reflector to shift to their operative positions at which point the cover extends therebetween, and when said cover is lowered it causes both said screen and said major reflector to shift to their collapsed positions, at which point the cover lies thereover to enclose said casing.

2. A theatre as set forth in claim 1, in which said major reflector is mounted on an inclined panel having side walls to shield said major reflector when it is in operative position.

3. A theatre as set forth in claim 1, wherein said screen is held within a frame having legs extending therefrom to block ambient light.

4. A theatre as set forth in claim 1, wherein said cover has side walls which shade the interior of said casing when said cover is lifted.

5. A theatre as set forth in claim 1, wherein the linkage between said cover and both said screen and said major reflector includes a lever arm, one end of which is pivotally connected to said cover, a point adjacent the other end being pivotally connected to a fulcrum mounted on the base of said casing, said arm being tilted upwardly when said cover is lifted, said screen being coupled to said arm by a first link member and said major reflector being coupled to said arm by a second link member whereby when said arm is tilted, said screen and said major reflector are shifted to their operative positions.

6. A theatre as set forth in claim 5, wherein said second link member includes a latching extension which engages said arm in its tilted position.

* * * * *